Dec. 31, 1929.   J. C. BURG   1,741,823
WALL PLATE SUPPORT FOR SEPARABLE CABLE CONNECTERS
Filed Aug. 22, 1927
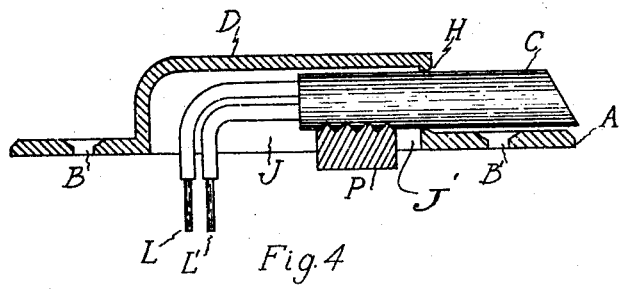
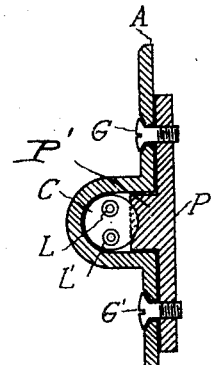
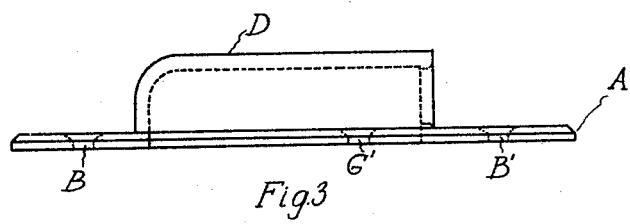
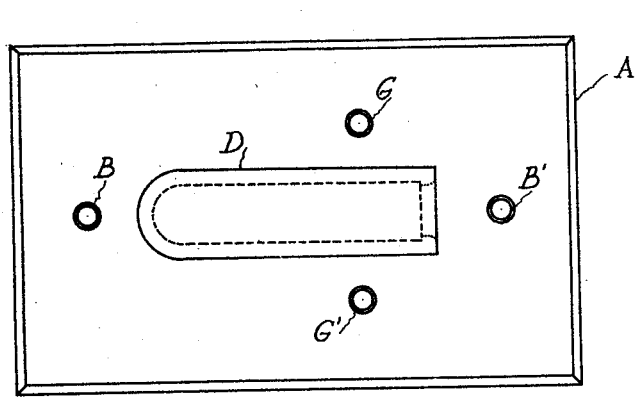
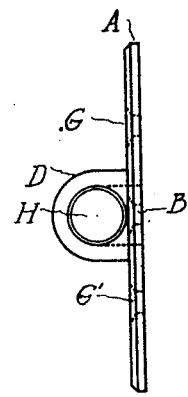
Inventor
John C. Burg
per L. Henry Gatter
Attorney Patented Dec. 31, 1929

1,741,823

UNITED STATES PATENT OFFICE

JOHN C. BURG, OF BROOKLYN, NEW YORK

WALL-PLATE SUPPORT FOR SEPARABLE CABLE CONNECTERS

Application filed August 22, 1927. Serial No. 214,551.

It is an object of my invention to produce a wall plate, particularly a fitting, having in mind that the fitting must support an electrical conductor such as a cable on portable cord without imposing any undue stresses or strains upon the current-carrying members thereof and maintaining small sized parts, and permitting the extension of said cable or cord from within the outlet in a neat and workmanlike manner, and also in a vertically disposed position.

It is my further object to produce a device of this type which will be inexpensive to manufacture and be sturdy and simple in construction. It is a further object of my invention to provide a device which will more readily comply with the requirements of the National Electrical Code appertaining to portable cords in garages and the like wherein it is required that the "female end be of such design or so hung that the connecter will break apart readily at any position of the cable", my purpose being to provide a device for adapting any of the present or future cable connecters or cord connecters to standard electrical outlet boxes of the wall or ceiling type. In other words it is the purpose of my fitting to adapt separable cable connecters used in portable cord cables to comply with the above requirements and to fit the standard practice outlet boxes in a more serviceable and workmanlike manner. Past and present practice has consisted of equipping these outlet boxes with a blank sheet metal cover provided with screw holes enabling them to be mounted upon the conventional outlet boxes and then drilling holes of sufficient size in the covers to permit the cable to enter and after the cable is passed into the box it is secured by means of a knot in the cable or a wrapping of commercial tape. The separable cable connecters were then mounted or connected to the outward portions of the portable cables and installation was ready.

The disadvantages of these were that the flat plate did not permit the cable to hang freely in a perpendicular position. It hung in an arc of about 90° at the point where it emerged from the flat plate. This, of course, resulted in the fatigue of the cable at its point of entry to outlet, sometimes causing short circuits, ground and even complete rupture of the cable. Also the method of supporting the cable within the box would fail by reason of strains on the portable cord when breaking the cable connecters being transmitted directly to the electrical connection, probably resulting in failure at this point and it is the purpose of my device to overcome these difficulties.

The construction and operation of my device will be more readily understood by reference to the attached drawing, in which like letters refer to like parts in the several views. Figure 1 shows a front exterior view, Figure 2 shows the bottom elevation of my device. Figure 3 shows the side exterior elevation. Figure 4 shows a section side elevation through the plane B—B', and Figure 5 shows a sectional end elevation through the plane G—G'.

The plate A of my device may be constructed of metal or other suitable rigid material. It may be a single device or it may be made in a multiplicity or plurality of such devices, providing for a plurality of cable outlets. At B B' I provide screw holes for supporting the device to the outlet box. Outlet box is not shown on the drawing but any suitable conventional box may be used. C is the cable or wire and D is the extended protruded portion of the plate casting through which the cable passes and which directs it into a vertically downward position. G and G' are screw holes for supporting and creating the clamping action of the cable gripping portion P, having a gripping lip P' extending through a rear opening J' into the hollow J of the protruded portion D, the inward side of the gripping lip is adapted to bite or securely clamp the cable C. H is the beveled hole for the entrance of the cable into the projection D and J is the hollow interior portion of the housing D, while L and L' are the current-carrying wires of the cable C. P is the cable clamping and gripping device which I prefer to make of insulating material but which may be made as well of other suitable material. The housing D may be cast as an integral part of the plate A and is preferably so cast. This housing D as will be readily observed, directs the cable in a downward position and the cable is supported and held securely by the gripping portion P, which carries any load that may be placed upon the cable.

The diameter of the aperture H is slightly less than the diameter of the hollow J and permits the passage of a cable C which is of a diameter slightly less than the diameter of the aperture. The gripping device P is supported on the rear face of the plate A and as before stated has a gripping lip extending through the rear opening J' for gripping the cable. This arrangement permits the exterior diameter of the portion D to be of a diameter slightly greater than the diameter of the cable C accomplishing a neat and economical construction, and permitting the wall plate to be attached flush on a wall with but very slight protrusion of the portion D.

My device is particularly useful in garages and the like where the cable must be securely supported and where it is usually necessary to provide an approved breaking switch coupling.

Having thus described my invention, what I claim and desire to secure by United States Letters Patent is:

1. In a device of the class described, a wall plate with a front extended protruded hollow portion formed with a bottom aperture of a diameter substantially equal to the diameter of the hollow for permitting the passage of a cable of a slightly smaller diameter, and with a rear opening extending thru the wall plate, and a cable clamp attached on the rear of the wall plate and having a gripping lip extending thru the said rear opening and into the said hollow portion for gripping the cable.

2. In a device of the class described, a wall plate with a front extended protruded hollow portion formed with a bottom aperture of a diameter substantially equal to the diameter of the hollow for permitting the passage of a cable of a slightly smaller diameter, and with a rear opening extending thru the wall plate, and a means for gripping the cable, extending thru the said rear opening and supported on the rear face of the said wall plate.

3. In a device of the class described, a wall plate with a front extended protruded hollow portion formed with a bottom aperture for permitting the passage of a cable, and with a rear opening extending thru the wall plate, and a cable clamp attached on the rear of the wall plate and having a gripping lip extending thru the said rear opening and into the said hollow portion for gripping the cable.

4. A wall plate for supporting a cable, comprising a plate with a front extended protruded hollow portion formed with a bottom aperture for permitting the passage of a cable, and with a rear opening extending thru the plate, and a cable clamp attached on the rear of the plate and arranged for extending thru the said rear opening into the hollow for gripping the cable.

In witness whereof I have hereunto set my hand to these specifications this 9th day of August, 1927.

JOHN C. BURG.